(12) United States Patent
Derrick et al.

(10) Patent No.: US 6,289,428 B1
(45) Date of Patent: Sep. 11, 2001

(54) SUPERSCALER PROCESSOR AND METHOD FOR EFFICIENTLY RECOVERING FROM MISALIGNED DATA ADDRESSES

(75) Inventors: John Edward Derrick, Round Rock; Hung Qui Le, Austin; David James Shippy, Austin; Larry Edward Thatcher, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/366,599

(22) Filed: Aug. 3, 1999

(51) Int. Cl.⁷ ........................................ G06F 12/02
(52) U.S. Cl. ................ 711/201; 711/220; 712/204; 712/206; 712/211
(58) Field of Search .................... 711/201, 220; 712/204, 206, 211

(56) References Cited

U.S. PATENT DOCUMENTS

| | | | |
|---|---|---|---|
| 5,748,855 | * 5/1998 | Levine et al. | 711/201 |
| 5,752,273 | * 5/1998 | Nemirovsky | 711/201 |
| 5,802,556 | * 9/1998 | Patel et al. | 711/109 |
| 6,112,297 | * 8/2000 | Ray et al. | 712/225 |

* cited by examiner

*Primary Examiner*—Heip T. Nguyen
(74) *Attorney, Agent, or Firm*—Casimer K. Salys; Bracewell & Patterson, L.L.P.

(57) ABSTRACT

A superscalar processor and method are disclosed for efficiently recovering from misaligned data addresses. The processor includes a memory device partitioned into a plurality of addressable memory units. Each of the plurality of addressable memory units has a width of a first plurality of bytes. A determination is made regarding whether a data address included within a memory access instruction is misaligned. The data address is misaligned if it includes a first data segment located in a first addressable memory unit and a second data segment located in a second addressable memory unit where the first and second data segments are separated by an addressable memory unit boundary. In response to a determination that the data address is misaligned, a first internal instruction is executed which accesses the first memory unit and obtains the first data segment. A second internal instruction is executed which accesses the second memory unit and obtains the second data segment. The first and second data segments are merged together. All of the instructions executed by the processor are constrained by the memory boundary and do not access memory across the memory boundary.

14 Claims, 4 Drawing Sheets

SUPERSCALER PROCESSOR AND METHOD FOR EFFICIENTLY RECOVERING FROM MISALIGNED DATA ADDRESSES

BACKGROUND OF THE INVENTION

1. Field of the Invention

The present invention relates in general to a data processing system and, in particular, to a data processing system including a superscalar processor. Still more particularly, the present invention relates in general to a superscalar processor and method for efficiently recovering from attempting to access misaligned data addresses.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. These multiple instructions may be executed in their original sequence, or out of order in a sequence which is different in some way from the original sequence. Such a microprocessor architecture typically utilizes LOAD and STORE instructions to move data between storage locations such as main memory, cache, register locations, and/or other types of storage locations. A LOAD/STORE instruction includes an address of the data to be moved.

A microprocessor architecture defines a unit of memory addressability. The unit of memory addressability may be a single byte, two bytes, four bytes, or any other predetermined size. For example, if a four-byte addressable unit is utilized, four bytes of data will be considered to be a single address. Therefore, the possible addressable locations will be multiples of four bytes. The LOAD and STORE instructions will specify a particular starting point in the storage device. Four bytes of data will then be either loaded from or stored into the storage device starting at the defined starting point.

A problem arises when the data address may be a unit which is not divisible by the unit of the addressable units into which the memory is organized. For example, the memory may be organized in four-byte units while data may be addressed by an amount which has a non-zero remainder when divided by the natural word size. An instruction, such as a single LOAD/STORE instruction, may attempt to access data which is located across data boundaries. For example, a single LOAD instruction may attempt to load four bytes of data from a location starting in the middle of an addressable memory unit. In this case, the instruction may attempt to load data located in the last two bytes of one addressable unit and the two bytes of data located in the next consecutive addressable unit.

One known method for executing these types of instructions is to add hardware to the load/store unit and the data cache in the microprocessor making the load/store unit and data cache capable of executing misaligned instructions. The load/store unit is then capable of addressing the middle of an addressable unit and across a data boundary. This method adds complex hardware to the architecture which increases the cost of producing the processor. The required addition of a second read/write port in the data cache is prohibitively expensive in terms of area.

Another known method is to solve this problem in software so that no additional hardware is needed. Although this solution does not increase the cost as significantly as the hardware solutions, this solution tends to be very slow and requires that significant efforts are taken by programmers to minimize such occurrences.

Therefore a need exists for a data processing system and method for efficiently recovering from misalignment of data addresses.

SUMMARY OF THE INVENTION

A superscalar processor and method are disclosed for efficiently recovering from misaligned data addresses. The processor includes a memory device partitioned into a plurality of addressable memory units. Each of the plurality of addressable memory units has a width of a first plurality of bytes. A determination is made regarding whether a data address included within a memory access instruction is misaligned. The data address is misaligned if it includes a first data segment located in a first addressable memory unit and a second data segment located in a second addressable memory unit where the first and second data segments are separated by an addressable memory unit boundary. In response to a determination that the data address is misaligned, a first internal instruction is executed which accesses the first memory unit and obtains the first data segment. A second internal instruction is executed which accesses the second memory unit and obtains the second data segment. The first and second data segments are merged together. All of the instructions executed by the processor are constrained by the memory boundary and do not access memory across the memory boundary.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art. The generic principles herein may be applied to other embodiments. Thus, the present invention is not intended to be limited to the embodiment shown but is to be accorded the widest scope consistent with the principles and features described herein.

The present invention is a system and method in a superscalar processor for efficiently recovering from a misaligned data address. When an instruction is decoded which includes a misaligned data address, the original instruction is replaced with a plurality of new internal instructions which do not include misaligned data addresses.

The first replacement internal instruction includes a data address from the displacement of the original, unaligned data address to an addressable memory unit boundary. The second replacement internal instruction includes a data address from the memory boundary to the ending point of the original, unaligned data address. The third instruction merges data obtained from these two new data segments together. In this manner, none of the instructions processed by this processor will access data across a memory boundary.

A superscalar processor includes a number of stages, such as the following, in the processor pipeline. Each stage includes one or more pipelines. In a typical first stage, referred to as an instruction fetch stage, an instruction is fetched from memory or an associative memory structure. Then, in a decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched according to the control bits to a unit having an execution stage, or possibly to an intervening reservation station, which ultimately issues the instruction to an associated execution stage, also called an execution unit.

The execution stage processes the operation as specified by the instruction. Executing an operation specified by an instruction includes accepting one or more operands and producing one or more results in the order of available operands.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 1:
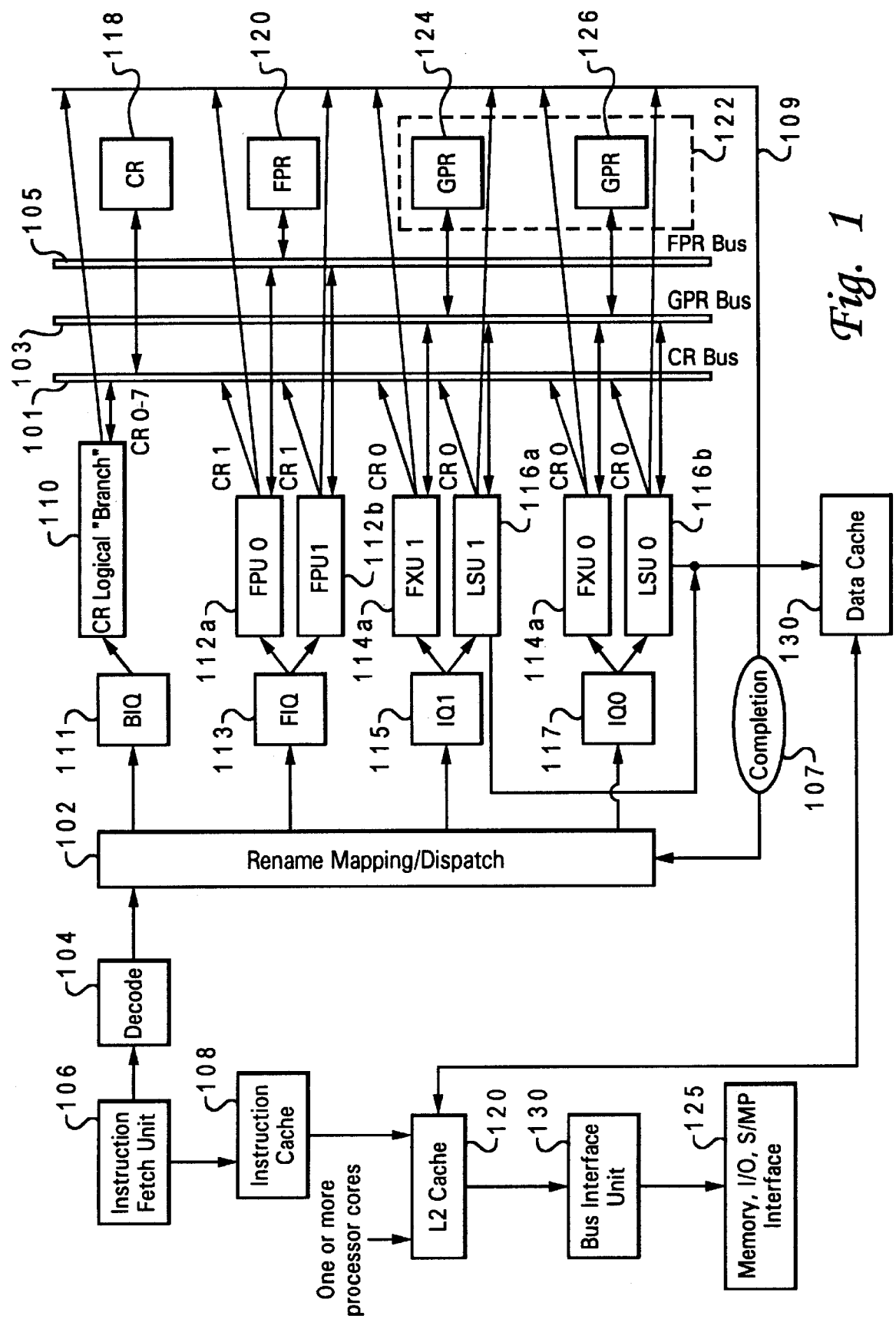
FIG. 1 illustrates a block diagram of a superscalar processor in accordance with the present invention.

FIG. 1 is a block diagram of a superscalar processor 100 in accordance with the present invention. The processor includes an instruction fetch unit (IFU) 106 which provides signals to a decode unit 104 which utilizes a rename mapping structure 102. The rename mapping structure 102 provides information directly to issue queue 111–117. The issue queues 111, 113, 115, and 117 in turn feed the execution units 110, 112a–b, 114a–b, and 116a–b.

Instruction cache 108 stores instructions received from IFU 106. Data cache 130 receives data from execution units 110–116. A level two (L2) cache 120 is utilized to store data and instructions from data cache 130 and instruction cache 108. Processor 100 includes a bus interface unit (BIU) 130 which passes information between L2 cache 120 and the peripheral device interface 125.

In this embodiment, branch issue queue 111 provides information to the condition register (CR) logical or branch unit 110. Floating point issue queue (FIQ) 113 provides information to the two floating point units (FPUs) 112a and 112b. Issue queue (IQ) 115 provides information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes that the issue queues can be arranged in a different manner and that arrangement would be within the spirit and scope of the present invention.

Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing conditional registers 0–7.(CR0-7). FPU 112a and FPU 112b provides information to CR 118 via CR bus 101 utilizing conditional register 1. FPU 112a and 112b also receive and provide information from and to FPR pool 120 via FPR bus 105. FXU 114a, FXU 114b, LSU 116a, and LSU 116b output results to CR 118 via CR bus 101 utilizing conditional register 0. FXU 141a, FXU 146, LSU 116a, and LSU 116b also receive and provide information from and to GPR pool 122 via GPR bus 103. GPR pool 122 is implemented utilizing a shadow GPR arrangement in which there are two GPRs 124 and 126. All of the execution units 110–116 provide results to the completion unit 107 via completion bus 109.

Figure 2:
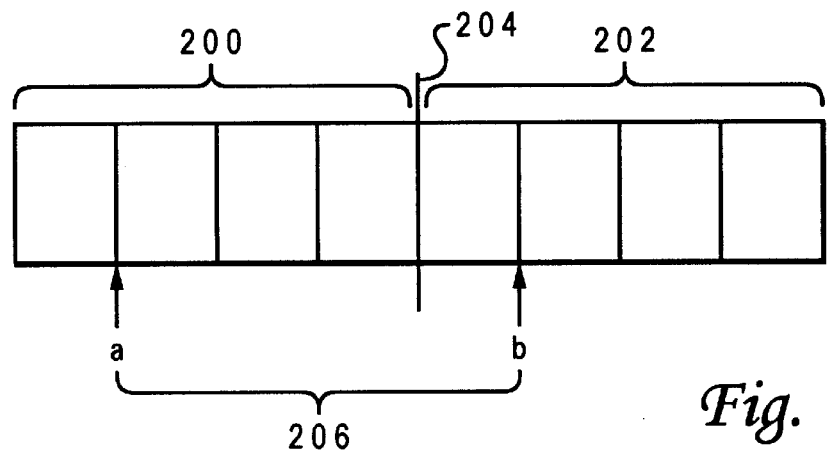
FIG. 2 depicts two addressable units in memory separated by a boundary in accordance with the method and system of the present invention.

FIG. 2 depicts two addressable units 200 and 202 in memory separated by a boundary 204 in accordance with the method and system of the present invention. The unit of memory addressability for purposes of this description is four bytes. However, any size unit may be utilized.

The data address of an instruction is misaligned when the data address crosses over a boundary, such as boundary 204. For example, an instruction might need to address a four-byte block of memory 206 starting at location "a" and ending at location "b". This four-byte memory block 206 crosses over boundary 204.

In accordance with the present invention, instead of executing this instruction with its misaligned data address, internal instructions are generated and executed. The internal instructions are generated such that they do not include misaligned data addresses. For example, a first instruction would be generated in response to an attempt to execute the original instruction which would read a first data segment from "a" to boundary 204. A second instruction would also be generated which would read a second data segment from boundary 204 to ending point "b". Finally, a third instruction would be generated which would then merge the two data segments, "a" to 204 and 204 to "b", together.

The actual boundary need not be the same for all memory regions or temporal states. However, the boundary must be an even multiple of the addressable memory unit size.

Figure 3:
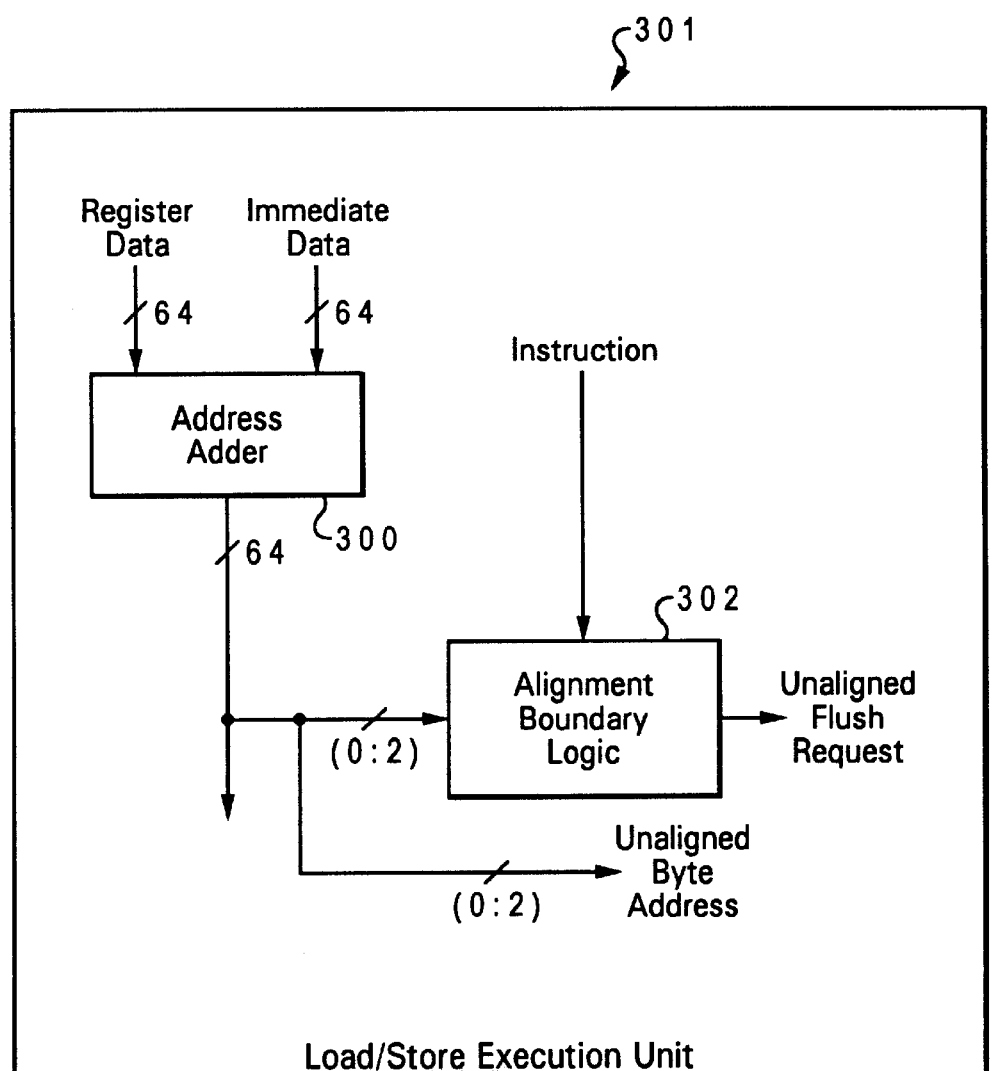
FIG. 3 illustrates a high level block diagram of a detection circuit included within a LOAD/STORE unit for detecting a misaligned data address within an instruction in accordance with the method and system of the present invention.

FIG. 3 illustrates a high level block diagram of a detection circuit 301 included within a LOAD/STORE unit 116a or 116b for detecting a misaligned data address within an instruction in accordance with the method and system of the present invention. Detection circuit 301 is utilized to detect when an instruction includes a misaligned data address. An instruction is received within alignment boundary logic 302.

The least significant bits of the data address for this instruction are received from an address adder 300 into alignment boundary logic 302. The least significant bits of the data address for this instruction are also output from the LOAD/STORE unit 116a as an unaligned byte address which will be received within decoder 104 as shown in FIG. 4.

Alignment boundary logic 302 inputs the instruction as well as the least significant bits of the data address to determine whether or not the data address crosses a boundary. If a determination is made that the data address does cross a boundary, an unaligned flush request is output from the alignment boundary logic 302 of the LOAD/STORE unit. The unaligned flush request is also received by decoder 104.

Figure 4:
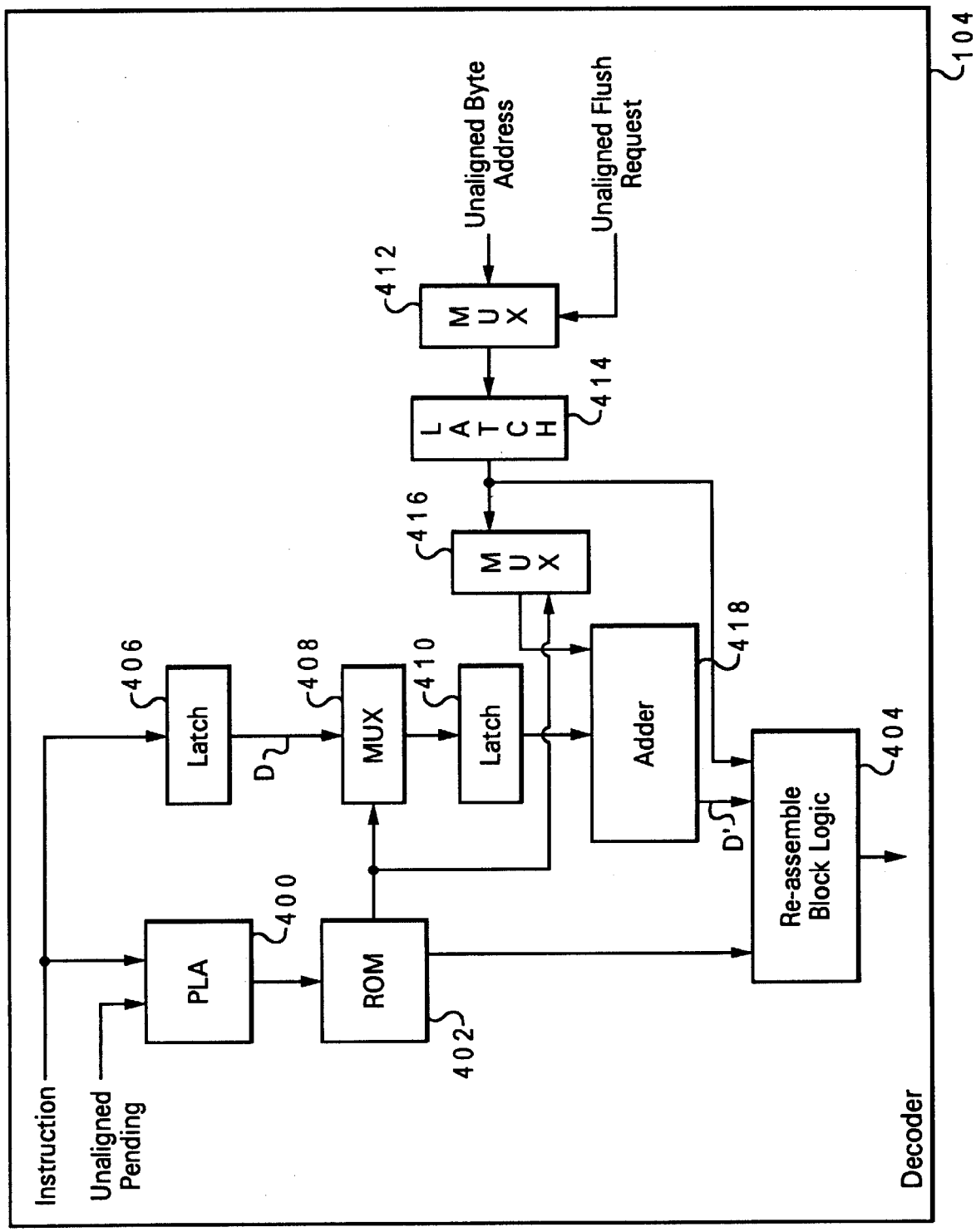
FIG. 4 illustrates a high level block diagram of an instruction generation circuit included within a decoder for generating instructions having an aligned data address in accordance with the method and system of the present invention.

FIG. 4 illustrates a high level block diagram of an instruction generation circuit 401 included within a decoder 104 for generating instructions having an aligned data address in accordance with the method and system of the present invention. Instruction generation circuit 401 is utilized to determine how many bytes to load as a first data segment, and how many bytes to load as a second data segment such that no memory boundary will be crossed. Instruction generation circuit 401 includes a PLA 400 for receiving an unaligned pending signal and an instruction. The unaligned pending signal indicates to the PLA 400 to convert the instruction to a special ROM address which is different from the typical ROM address for this instruction. The PLA 400 output is received by ROM 402. ROM 402 produces internal operations and control signals which are received throughout instruction generation circuit 401 as described.

The instruction is also received by a latch 406 and then output to multiplexer 408. The data received by multiplexer 408 includes the original, unaligned data address "D". Multiplexer 408 holds this unaligned data address until time to calculate the new address segments as controlled by ROM 402.

Instruction generation circuit 401 also includes a multiplexer 412 for receiving the unaligned byte address from LOAD/STORE unit 106a and the unaligned flush request signal. When the unaligned flush request signal is received, multiplexer 107 receives the unaligned byte address. This unaligned byte address is then received by latch 414 and then multiplexer 416.

Multiplexer 416 captures and holds the unaligned value as controlled by ROM 402. A signal is output from multiplexer 416 to an adder 413 which generates a new displacement value of the form LOAD RT, RA, D'.

Adder 418 generates two data segment addresses in two successive cycles. The first data segment address includes the address from the starting point of the original unaligned address, such as "a" in FIG. 2 up to boundary 204. The second data segment address includes the address from boundary 204 to the ending point of the original unaligned address, such as "b" in FIG. 2. The first data segment address is generated by using the displacement field. The second data segment address is generated by taking the displacement field and adding the unaligned address.

Adder 418 then outputs the two data segment addresses to re-assemble block logic 404 which generates two instructions. The first instruction is an instruction having an aligned data address from the starting point of the data address to a boundary. The second instruction is an instruction having an aligned data address from the boundary to the ending point of the data address. Re-assemble block logic 404 also generates a merge instruction in the next cycle to merge the two data segments together.

Those skilled in the art will recognize that two or more instruction generation circuits 401 may be coupled together in order to simultaneously generate the first, second, and third internal instructions having aligned data addresses.

Figure 5:
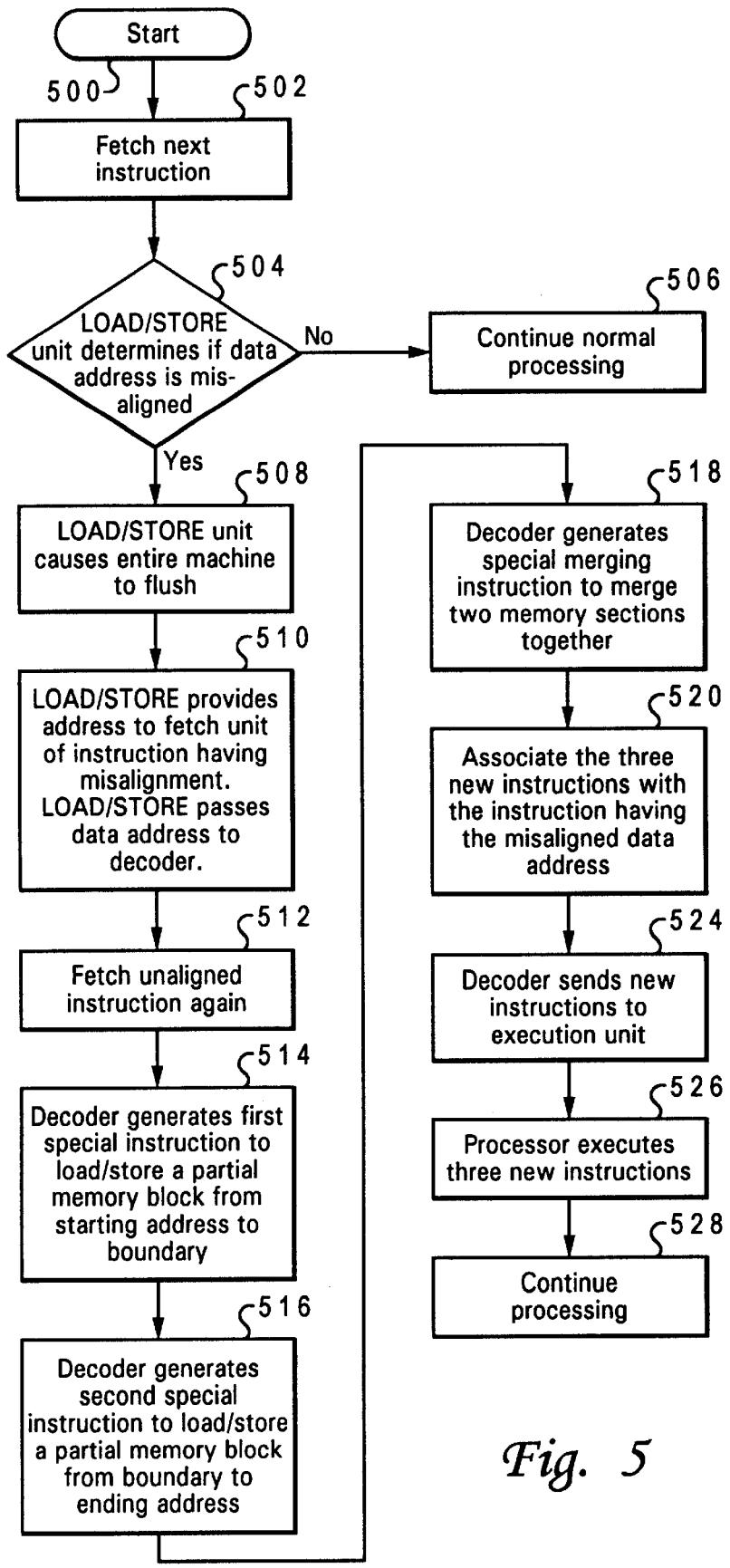
FIG. 5 depicts a high level flow chart which illustrates generating a plurality of instructions having aligned data addresses in response to an attempt to execute an instruction having an unaligned data address in accordance with the method and system of the present invention.

FIG. 5 illustrates a high level flow chart which depicts generating a plurality of instructions having aligned data addresses in response to an attempt to execute an instruction having an unaligned data address in accordance with the method and system of the present invention. The process starts as depicted at block 500 and thereafter passes to block 502 which depicts fetching the next instruction. Thereafter, block 504 illustrates a determination by the LOAD/STORE unit of whether or not the data address included in this instruction is misaligned. If a determination is made that the data address in this instruction is not misaligned, the process passes to block 506 which depicts the continuation of normal processing.

Referring again to block 504, if the LOAD/STORE unit determines that the data address in this instruction is misaligned, the process passes to block 508 which illustrates the LOAD/STORE unit causing the entire processor to flush. Thereafter, block 510 depicts the LOAD/STORE unit providing the address of this instruction which included a misaligned data address to the FETCH unit and passing this misaligned data address to the decoder. Next, block 512 illustrates the fetching the unaligned instruction again.

The process then passes to block 514 which depicts the decoder generating a first internal instruction which will load/store data from/to a partial addressable memory unit. The internal instruction specifies a block of memory located from a starting address which is in the middle of an addressable memory unit to the address boundary. Next, block 516 illustrates the decoder generating a second internal instruction which will load/store data from/to a second partial addressable memory unit. The internal instruction specifies a block of memory located from a starting address which is the boundary where the first internal instruction ended and continuing to an ending address in the middle of the addressable memory unit.

The process then passes to block 518 which depicts the decoder generating a third internal instruction which will merge the two obtained memory segments together and store them in a register utilized by the original LOAD/STORE instruction. Next, block 520 illustrates associating all three new internal instructions with the original instruction having the misaligned data address. Thereafter, block 524 illustrates the decoder dispatching the three new internal instructions instead of the original instruction. Block 526, then, depicts the processor executing the three new internal instructions. Thereafter, block 528 illustrates the continuation of processing.

While a preferred embodiment has been particularly shown and described, it will be understood by those skilled in the art that various changes in form and detail may be made therein without departing from the spirit and scope of the present invention.

What is claimed is:

1. A method in a superscalar processor for efficiently recovering from misaligned data addresses, said processor including a memory device partitioned into a plurality of addressable memory units, each of said plurality of addressable memory units having a width of a first plurality of bytes, said method comprising the steps of:

determining whether a data address included within a memory access instruction is misaligned, said data address being misaligned when said data address includes a first data segment located in a first addressable memory unit and a second data segment located in a second addressable memory unit, said first and second data segments being separated by an addressable memory unit boundary;

in response to a determination that said data address is misaligned, replacing said memory access instruction with a first, a second, and a third internal instruction;

executing said first internal instruction which accesses said first memory unit and obtains only said first data segment;

executing said second internal instruction which accesses said second memory unit and obtains only said second data segment; and executing said third instruction, said third instruction merging said first and second data segments together, so that in response to said memory access instruction having the misaligned data address, the processor executes the plurality of internal instructions having aligned data addresses.

2. The method according to claim 1, further comprising the step of said processor being capable of accessing each of said plurality of memory units utilizing one of a plurality of data addresses, each of said plurality of data addresses having a width of a second plurality of bytes, wherein said second plurality of bytes is smaller than said first plurality of bytes.

3. The method according to claim 2, further comprising the steps of:

generating said first internal instruction including a data address of said first memory unit, said data address of said first data segment including a starting data address located within said first one of said plurality of addressable memory units and an ending address of said memory boundary;

generating said second internal instruction including a data address of said second memory unit, said data address of said second data segment including a starting data address of said memory boundary and an ending address located within said second one of said plurality of addressable memory units; and generating said third internal instruction for merging said first and second data segments together.

4. The method according to claim 3, further comprising the steps of:

in response to a LOAD/STORE unit included within said processor receiving said memory access instruction, said LOAD/STORE unit determining whether said data address included within said memory access instruction is misaligned; and in response to a determination that said data address is misaligned, said LOAD/STORE unit transmitting said data address to a DECODER unit included within said processor, and said LOAD/STORE unit transmitting an address of said memory access instruction to a FETCH unit included within said processor.

5. The method according to claim 4, further comprising the step of in response to said DECODER unit receiving said data address from said LOAD/STORE unit, said DECODER unit generating said first, second, and third internal instructions.

6. The method according to claim 5, further comprising the step of in response to said FETCH unit receiving said address of said memory access instruction from said LOAD/STORE unit, said FETCH unit re-fetching said memory access instruction.

7. The method according to claim 6, further comprising the steps of:

in response to said FETCH unit re-fetching said memory access instruction, said DECODER unit dispatching said first, second, and third internal instructions; and one of a plurality of execution units included within said processor executing said first, second, and third internal instructions.

8. A superscalar processor for efficiently recovering from misaligned data addresses, said processor including a memory device partitioned into a plurality of addressable memory units, each of said plurality of addressable memory units having a width of a first plurality of bytes, comprising:

means for determining whether a data address included within a memory access instruction is misaligned, said data address being misaligned when said data address includes a first data segment located in a first addressable memory unit and a second data segment located in a second addressable memory unit, said first and second data segments being separated by an addressable memory unit boundary;

means for replacing said memory access instruction with a first, a second, and a third internal instructions, in response to a determination that said data address is misaligned;

means for executing said first internal instruction which accesses said first memory unit and obtains only said first data segment;

means for executing said second internal instruction which accesses said second memory unit and obtains only said second data segment; and means for executing said third instruction, said third instruction merging said first and second data segments together, so that in response to said memory access instruction having the misaligned data address, the processor executes the plurality of internal instructions having aligned data addresses.

9. The processor according to claim 8, further comprising means for accessing each of said plurality of memory units utilizing one of a plurality of data addresses, each of said plurality of data addresses having a width of a second plurality of bytes, wherein said second plurality of bytes is smaller than said first plurality of bytes.

10. The processor according to claim 9, further comprising:

means for generating said first internal instruction including a data address of said first memory unit, said data address of said first data segment including a starting data address located within said first one of said plurality of addressable memory units and an ending address of said memory boundary;

means for generating said second internal instruction including a data address of said second memory unit, said data address of said second data segment including a starting data address of said memory boundary and an ending address located within said second one of said plurality of addressable memory units; and means for generating said third internal instruction for merging said first and second data segments together.

11. The processor according to claim 10, further comprising:

means within a LOAD/STORE unit included within said processor for determining whether said data address included within said memory access instruction is misaligned in response to said LOAD/STORE unit receiving said memory access instruction; and means within said LOAD/STORE unit for transmitting said data address to a DECODER unit included within said processor and for transmitting an address of said memory access instruction to a FETCH unit included within said processor in response to a determination that said data address is misaligned.

12. The processor according to claim 11, further comprising means within said DECODER unit capable of generating said first, second, and third internal instructions in response to said DECODER unit receiving said data address from said LOAD/STORE unit.

13. The processor according to claim 12, further comprising means within said FETCH unit capable of re-fetching said memory access instruction in response to said FETCH unit receiving said address of said memory access instruction from said LOAD/STORE unit.

14. The processor according to claim 13, further comprising:
  means within said DECODER unit for dispatching said first, second, and third internal instructions in response to said FETCH unit re-fetching said memory access instruction; and
  one of a plurality of execution units included within said processor for executing said first, second, and third internal instructions.

* * * * *

UNITED STATES PATENT AND TRADEMARK OFFICE
CERTIFICATE OF CORRECTION

PATENT NO. : 6,289,428 B1
DATED : September 11, 2001
INVENTOR(S) : Derrick et al.

Page 1 of 1

It is certified that error appears in the above-identified patent and that said Letters Patent is hereby corrected as shown below:

Column 5,
Line 47, please change "413" to -- 418 --.

Signed and Sealed this

Twenty-eighth Day of May, 2002

Attest:

*Attesting Officer*

JAMES E. ROGAN
*Director of the United States Patent and Trademark Office*